M. WEINTRAUB & A. KATZ.
STICK PIN GUARD.
APPLICATION FILED AUG. 19, 1914.
1,145,726.
Patented July 6, 1915.
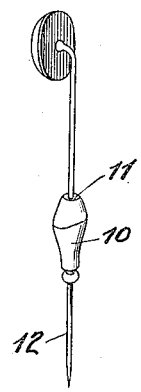
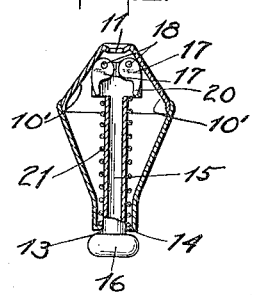
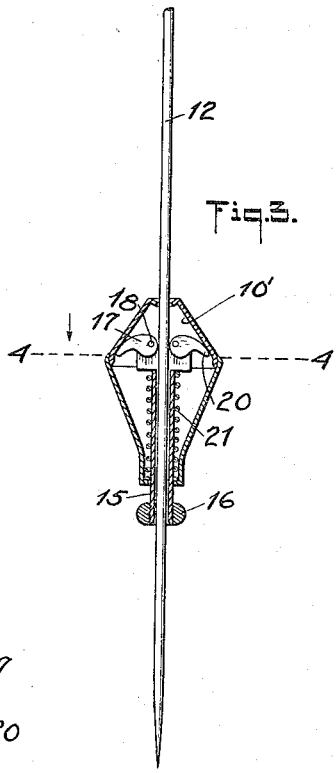
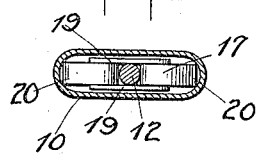
WITNESSES
INVENTORS
Marcus Weintraub
Alex Katz
BY
ATTORNEYS

UNITED STATES PATENT OFFICE.

MARCUS WEINTRAUB AND ALEX KATZ, OF HOBOKEN, NEW JERSEY.

STICK-PIN GUARD.

1,145,726.  Specification of Letters Patent.  Patented July 6, 1915.

Application filed August 19, 1914. Serial No. 857,514.

*To all whom it may concern:*

Be it known that we, MARCUS WEINTRAUB and ALEX KATZ, citizens of the United States, and residents of Hoboken, in the county of Hudson and State of New Jersey, have invented a new and Improved Stick-Pin Guard, of which the following is a full, clear, and exact description.

This invention relates to jewelry and has particular reference to scarf pins, stick pins or the like.

Among the objects of the invention is to provide an improved safety attachment or lock for coöperation with the shank or pin portion of the stick pin so as to prevent loss or theft thereof.

More definitely stated our invention comprises a guard in the form of a hollow casing adapted to slip freely over the point of the pin and along the shank thereof after the pin has been put into position, said casing being equipped with devices on the inside thereof to automatically grip the pin shank so as to prevent the pin and casing from longitudinal separation except upon manipulation of a certain plunger constituting a part of the gripping devices.

The foregoing and other objects of the invention will hereinafter be more fully described and claimed and illustrated in the drawings forming a part of this specification in which like characters of reference indicate corresponding parts in all the views, and in which—

Figure 1 is a perspective view of our improvement attached to a conventional form of stick pin; Fig. 2 is a vertical sectional view of the guard detached and indicating the gripping devices in operative position; Fig. 3 is a similar view indicating the pin extending from the guard but with the gripping devices in loose position; and Fig. 4 is a transverse section substantially on the broken line 4—4 of Fig. 3.

The several parts of the device may be made of any suitable materials, and the relative sizes and proportions, as well as the general design of the mechanism, may be varied to a considerable extent without departing from the spirit of the invention hereinafter more fully described and specifically claimed.

At 10 we show a hollow casing or shell of any suitable form or construction but of a rigid nature and having a hole 11 at its upper end through which the point and shank 12 of a stick pin is adapted to project. At the lower end of the shell 10 is a hole 13 in axial alinement with the hole 11 but of a larger diameter, and surrounding said hole is a horizontal inwardly projecting flange 14.

At 15 we show a tubular plunger fitted slidably in said hole 13 and having a head 16 at its lower exposed end. At the upper end of the plunger 15 is a clutch of any suitable construction adapted to automatically grip and hold the shank of the pin 12 at any point to which the shell 10 or guard may be moved.

The clutch referred to is shown herein as comprising a pair of cam members 17 eccentrically pivoted at 18 to a pair of plates 19 constituting extensions of the upper end of the plunger 15 or otherwise secured to the plunger. The cams include fingers or points 20 which are caused to impinge against the upwardly converging inclined inner walls 10′ of the top of the shell, when the pin passes downwardly through the shell holes 11 and 13, forcing the cam members away from each other or around the horizontal pivots 18.

Any suitable means may be provided to cause the plunger to move upwardly automatically so as to cause the fingers 20 of the clutch cams to bear against said converging walls of the shell. For this purpose we provide a spring 21 coiled around the plunger and bearing at its lower end against the aforesaid flange 14 of the shell and at its upper end against the clutch plates 19. The tendency of the spring, therefore, is to cause the clutch to assume the position shown in Fig. 2 when the pin is not in position, and in any event to keep the plunger elevated as far as is permitted by the coöperation between the clutch cams and the converging walls of the shell.

Having thus described a preferred embodiment of the construction, the operation may be summarized briefly as follows: With the parts in the position shown in Fig. 2, the introduction of the point of the pin 12 downwardly through the hole 11 between the cams 17 and thence through the plunger will not be obstructed by the clutch, the clutch members moving downwardly without resistance sufficiently far to allow the pin to pass as shown, for instance, in Fig. 3. The force of the spring 21 will serve automatically, however, to cause the parts to assume the relation to one another as shown in Fig.

3, or a position in which the clutch is so moved upwardly by the spring as to cause the points or fingers 20 of the cams 17 to bear against the walls 10' of the shell and thereby setting up a sufficient degree of friction between the pin shank and the eccentric parts of the cams to make it impossible for the pin to be withdrawn from the shell without first releasing the clutch by positive means. In fact, the harder the pull tending to separate the pin and shell directly, the tighter will the grip become between the cams and the pin. By pulling downwardly, however, upon the head of the plunger by one's fingernails, the clutch is readily released from its gripping position, and a continued pull upon the head 16 will carry with it the entire guard from the pin. The normal position of the guard parts when detached is shown in Fig. 2, and, as stated above, the pin may be inserted into place directly without resistance or manipulation of the plunger.

Having thus described our invention, we claim as new and desire to secure by Letters Patent:—

1. The combination with a stick pin, of a guard therefor comprising a shell having a pair of converging inner surfaces at its upper end and alined holes at its top and bottom through which the pin is adapted to pass, a plunger operating through the lower hole, a clutch carried by the upper end of the plunger and comprising a pair of gripping cams acting upon the pin and a pair of arms coöperating with said converging surfaces, means coöperating with the plunger to cause the cam arms to act automatically upon the converging surfaces aforesaid to set the cams, and means connected to the lower end of the plunger to release the clutch.

2. In a device of the character set forth, the combination with a stick pin, of a guard therefor comprising a rigid hollow shell having axially alined holes at its top and bottom, the lower end of the shell having an inwardly projecting flange surrounding the lowermost hole, a plunger slidably fitted in said lower hole, a clutch secured to the upper end of the plunger and comprising gripping cams having arms coöperating with the upper portion of the shell to cause the cams to grip the pin, said pin extending through the uppermost shell hole and the plunger, a spring surrounding the plunger and having its lower end bearing against said flange and its upper end bearing against the clutch tending to lift the plunger and clutch to cause the arms to bear against the shell walls, and means connected to the lower end of the plunger to release the clutch.

3. The combination with a stick pin, of a guard therefor comprising a rigid shell having a tapered upper end through which the pin is adapted to pass, a hollow plunger movable in the shell, a spring coöperating with the plunger and shell tending to automatically cause the upper end of the plunger to approach the tapered end of the shell, gripping cams carried by the upper end of the plunger and having arms coöperating with the tapered portion of the shell whereby the cams are caused to automatically grip the pin, and means to release said gripping means for removing the guard from the pin.

In testimony whereof we have signed our names to this specification in the presence of two subscribing witnesses.

MARCUS WEINTRAUB.
ALEX KATZ.

Witnesses:
Louis S. Cohen,
Louis Greenberg.

Copies of this patent may be obtained for five cents each, by addressing the "Commissioner of Patents, Washington, D. C."